W. B. McLARTY.
ELECTRICAL SHOT FIRING MACHINE FOR MINES.
APPLICATION FILED OCT. 7, 1908.
916,476.
Patented Mar. 30, 1909.
3 SHEETS—SHEET 3.
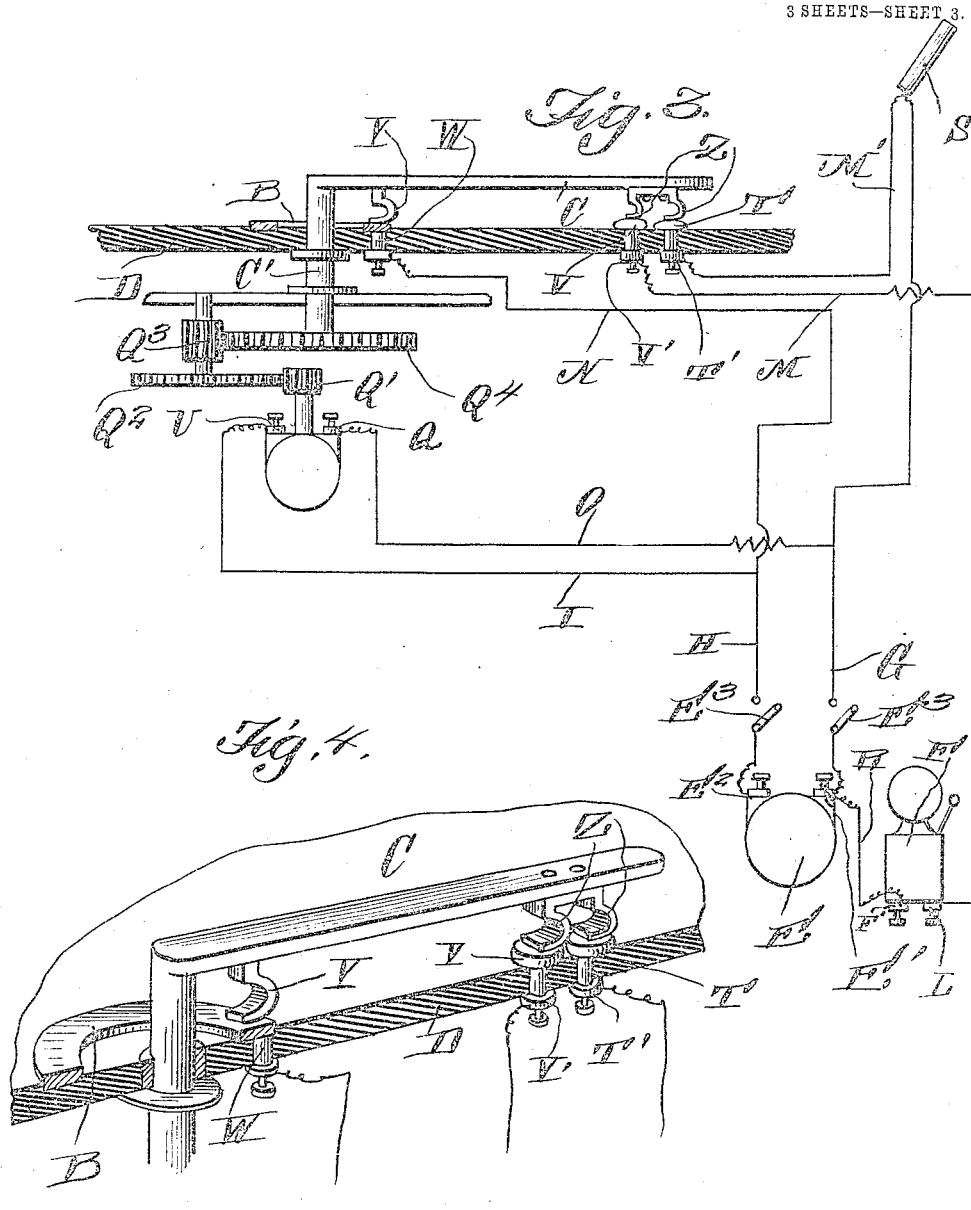

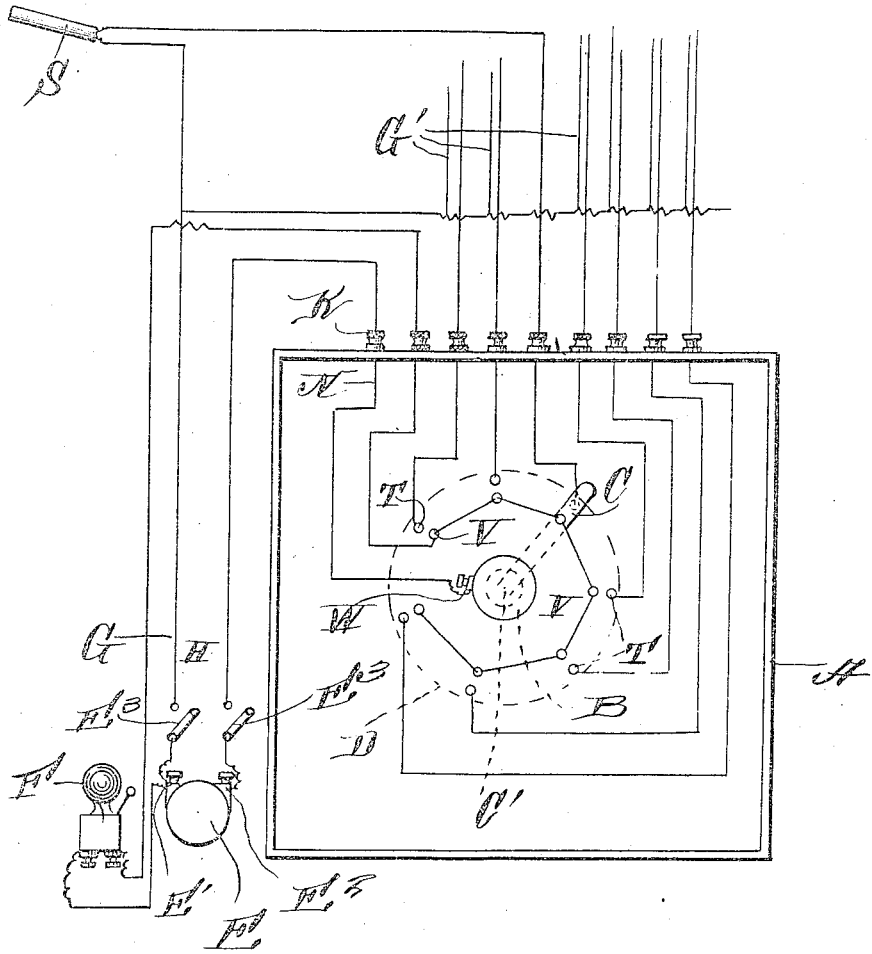

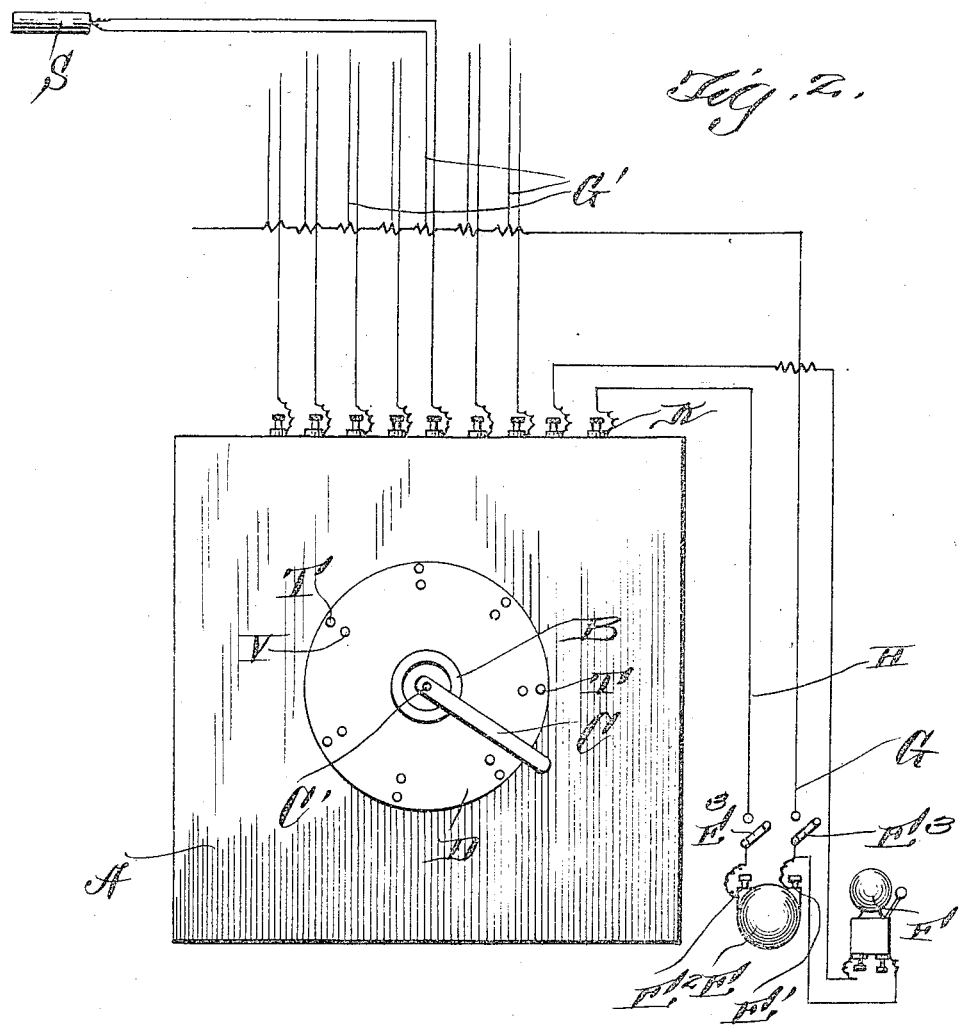

UNITED STATES PATENT OFFICE.

WALTER B. McLARTY, OF WILBURTON, OKLAHOMA, ASSIGNOR OF ONE-HALF TO JEFF T. BOUCHER, OF WILBURTON, OKLAHOMA.

ELECTRICAL SHOT-FIRING MACHINE FOR MINES.

No. 916,476. Specification of Letters Patent. Patented March 30, 1909.

Application filed October 7, 1908. Serial No. 456,625.

*To all whom it may concern:*

Be it known that I, WALTER B. McLARTY, a citizen of the United States, residing at Wilburton, in the county of Latimer and State of Oklahoma, have invented certain new and useful Improvements in Electrical Shot-Firing Machines for Mines; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in electrical shot firing apparatus for mines and the object in view is to provide a system whereby firing of the shots may be done from the outside of the mine at different intervals of time, and comprises mechanism so arranged that, after the wires have been connected to the charge, it will explode the shots at a predetermined moment without the necessity of the operator being within the mine.

By the methods commonly employed at present of hand firing, one or more people are detailed for igniting the fuse of the charges and which frequently results in injury to life and limb by the explosion occurring before the operators reach positions of safety.

The invention comprises an apparatus, which is provided with a series of circuit closing means to conduct the current of electricity to different charges and, whenever a contact is made by the circuit closer, the charge will be exploded and at the same time cause a signal to be made outside of the mine to give notice so that the operator may know that the machine is in operation.

My invention is illustrated in the accompanying drawings which, with the letters of reference marked thereon, form a part of this application and in which:—

Figure 1 is a rear elevation of the apparatus showing mechanism for closing the circuits through a series of mine charges and illustrating the circuits through which the currents are passed. Fig. 2 is a front elevation of the apparatus. Fig. 3 is a detail sectional view of the mechanism for transmitting movement to the traveling circuit closer, and Fig. 4 is an enlarged detail view of one set of circuit closing devices.

Reference now being had to the details of the drawings by letter, A designates a suitable frame in which the apparatus is adapted to be located and is made preferably air-tight to prevent dampness from a mine in which the apparatus is adapted to be located from rusting the circuit closer.

E designates the source of energy which may be a dynamo, batteries or current from an electric light plant, and E' designates a binding post connected to one pole of the source of electric energy, and E² the other pole. A suitable wire G is connected to the binding post E' and a wire H to the binding post E² and suitable switches E³ are located in said wires G and H. The wires G and H are adapted to pass down into the mine and the wire H is connected to a binding post K mounted upon said casing A, while the wire G passes beyond the machine and is connected to one or more of the wires G', each of which is adapted to be connected to a mine charge S. This feature of the invention is for the purpose of saving the running of a plurality of wires for the machine from every explosive charge. A wire N is connected to the binding post K and also to a binding post W, which latter is connected to a copper ring B of any suitable size or shape and which is mounted upon a non-conducting base D. Mounted in suitable bearings within said insulated base is a shaft C' having a revoluble arm C to which a circuit closer Y is electrically connected. Said circuit closer Y is continuously in contact with the metallic ring B, and positioned at different intervals and in pairs upon the non-conductor base are the series of contacts V and T which pass through apertures in said base and have binding posts V' and T', to which the wires M and M' are respectively connected, the former of said wires M passing through and connected to a binding post L. Circuit closers Z arranged in pairs and electrically connected are mounted upon the revoluble arm C and are made preferably of spring steel so that, when the revoluble arm actuates the circuit closers over the contacts V and T, they will make good connections and insure the exploding of the charges, and the circuit closer Y is also made of the same resilient material so that it will rub tightly upon the contact ring B at all times. The wire M' is also connected to the charge S as is also the wire G. Each of the explosive charges is adapted to be provided with an electrically primed fuse of any ordinary type. The wire M which is connected to the binding post V' and is also electrically connected to the binding post L is adapted to communicate a current to the bell F. The other binding post F' of the electric bell is connected through the medium of the wire R with the binding post E' of the electric generator or source of energy.

Referring to Fig. 3 of the drawings will be seen the wires I and O, the former of which is electrically connected with the wire H at one end and its other end connected to the binding post U on a motor or electric clockwork mechanism of any desired type, while the wire O connects the binding post Q, also upon said motor or electric clock mechanism, with the wire G. Q' designates a gear wheel which is adapted to be actuated by the clock-work mechanism and is in mesh with a gear wheel $Q^2$ which actuates a pinion $Q^3$ in mesh with the gear wheel $Q^4$ to which the shaft C' is fixed and affording means for rotating the latter.

The operation of my apparatus is as follows:—The various charges, as many as may be desired to be fired by my improved apparatus, are arranged in the places where the charges are desired to be exploded and, the necessary electrically primed fuses of any ordinary type being applied to the charges, the electrical connections are made as shown and described. The switch being cut in, the current will pass through the wires H and G, thence through the wires I and O to the binding posts upon the motor or clock-work, setting the same in operation and causing motion to be imparted to the shaft C' through the intermeshing gears. Said gearing, which is arranged preferably to cause the arm C to rotate slowly, moves over the insulating base D, the circuit breaker Y being constantly in contact with the metallic ring B, while the circuit closers Z will successively come in contact with the contacts V and T, thus causing a current to be passed through the connections shown to the various charges to be exploded.

It will thus be noted from the foregoing that, by the provision of an electric apparatus as shown and described, a plurality of charges may be exploded one at a time, the movements of the apparatus being predetermined by the movement of the electric motor or clock actuating mechanism and without the necessity of the operator being within danger zone, a signal being given to warn the operator that the apparatus is in operation.

What I claim to be new is:—

1. An electric shot firing apparatus for mines, comprising a generator, a rotatable controller arm, circuit closers mounted upon said arm, means for operating the latter, a conductor ring against which one of said closers is constantly in contact, electrical connections between said conductor ring and source of energy, a series of contact points against which the circuit closers upon said arm are adapted to contact at predetermined moments, electrical connections between said contact points, the source of energy and the charges to be fired, and an electric signal in the circuit with said ring, as set forth.

2. An electric shot firing apparatus for mines, comprising a generator, a rotatable controller arm, circuit closers mounted upon said arm, means for operating the latter, a conductor ring, an insulating base upon which the same is supported, a binding post extending through said base, electric circuit closers upon said arm, one of which is constantly in contact with said ring as the controller rotates, electrical connections between said binding post to the ring and the source of energy, contact points arranged in pairs upon said base and against which circuit closers upon said arm are adapted to contact at predetermined moments, wire connections between said contact points with the source of energy and the charges to be fired, and an electric bell in the circuit with said controller arm, as set forth.

In testimony whereof I hereunto affix my signature in the presence of two witnesses.

WALTER B. McLARTY.

Witnesses:
J. M. IVEY,
EUGENE ROONEY.